US005911302A

United States Patent [19]

Jackson

[11] Patent Number: 5,911,302

[45] Date of Patent: Jun. 15, 1999

[54] CIRCULATING PADDLE BOARD POSITIONING APPARATUS

[75] Inventor: James G. Jackson, Salmon Arm, Canada

[73] Assignee: CAE Newnes Ltd., Salmon Arm, Canada

[21] Appl. No.: 08/759,095

[22] Filed: Nov. 29, 1996

[51] Int. Cl.[6] .................................................... B65G 47/26

[52] U.S. Cl. .................. 198/456; 144/245.1; 144/250.23

[58] Field of Search ......................... 198/456; 144/245.1, 144/245.2, 250.23, 242.1

[56] References Cited

U.S. PATENT DOCUMENTS

| | | | |
|---|---|---|---|
| 2,918,951 | 12/1959 | Haumann | 198/456 |
| 3,565,140 | 2/1971 | Jacobsen | 144/242.1 |
| 3,701,408 | 10/1972 | Northsea | 198/456 |
| 3,970,128 | 7/1976 | Kohlberg | 144/245.1 |
| 4,068,695 | 1/1978 | Seaman | 144/242.1 |
| 4,069,910 | 1/1978 | Faley et al. | 198/456 |
| 4,120,333 | 10/1978 | Hellgren et al. | 144/242.1 |
| 4,143,755 | 3/1979 | Keller | 198/456 |
| 4,269,245 | 5/1981 | Fornell et al. | 144/245.1 |
| 4,383,561 | 5/1983 | Gregoire et al. | 198/456 |
| 4,413,662 | 11/1983 | Gregoire et al. | 144/245.2 |
| 4,753,335 | 6/1988 | Goater | 198/456 |
| 5,142,955 | 9/1992 | Hale | 83/75.5 |
| 5,174,351 | 12/1992 | Lindenblatt et al. | 144/356 |
| 5,368,080 | 11/1994 | Hamel | 144/245.2 |
| 5,381,712 | 1/1995 | Head, Jr. et al. | 144/245.2 |

FOREIGN PATENT DOCUMENTS

| | | | |
|---|---|---|---|
| 624252 | 7/1961 | Canada | 198/456 |

*Primary Examiner*—David A. Bucci
*Assistant Examiner*—Thuy V. Tran
*Attorney, Agent, or Firm*—Antony C. Edwards

[57] ABSTRACT

In a board positioning device for longitudinally positioning a board translating in a first direction at a translation speed on a board translating device, wherein the board translating in the first direction is aligned along its length in a second direction perpendicular to the first direction and the board is urged by board ending rolls in the second direction against a board positioning member on the board positioning device, wherein the first and second directions lie in a generally horizontal plane, the board positioning device includes (a) a selectively actuable guide member cooperating with the board positioning member for selectively actuably guiding and positioning in the second direction the board positioning member, and (b) a board positioning member translating apparatus for translating the board positioning member in the first direction at the translation speed in cooperative alignment with the board, wherein the board is urged against the board positioning member by the board ending rolls and the board positioning member selectively positioned at a board optimizing position to thereby selectively position the board in the second direction at an optimized board position predetermined by an optimizer cooperating with the selectively actuable guide member.

4 Claims, 5 Drawing Sheets

CIRCULATING PADDLE BOARD POSITIONING APPARATUS

FIELD OF THE INVENTION

This invention relates to the field of sawmill machinery, and in particular to board positioning devices.

BACKGROUND OF THE INVENTION

In a typical lumber mill or planer mill, each board is moved along sideways, that is, oriented transversely on a lugged transfer prior to trimming. Typically, the lugs on the lugged transfer are evenly spaced at precise intervals. The boards are passed through an electronic scanner which determines the shape of each board and sends the shape information to an optimizer. The optimizer in turn sends the information to a controller. The controller activates saws above a trimmer saw deck to trim the board, in an attempt to maximize board utilization. Typically, however, saws are spaced about two feet apart, so that depending upon the physical end defects of a board, up to almost two feet on each end of the board can be trimmed and thus wasted, which can result in a considerable wastage of useful wood.

In order to minimize such wastage, in the prior art, board positioners have been developed which utilize a plurality of parallel rollers, so-called ending rolls, that are driven in a direction at right angles to the direction of translation of the boards over the transfer deck on the transfer chains, thus moving the ends of the boards into contact with a positioning fence. When on the rollers, the boards are continually thrust laterally across the transfer deck, until the board is raised above the rollers this disengaging the board from the rollers at a predetermined time. Such prior art devices have the disadvantage that wet or icy boards will often slip on the rollers while being moved. In addition, such devices suffer from the fact that tapered ends of the boards abutting the positioning fence can be so structurally weak as to collapse or break when contacting the fence. Because the board was scanned and optimized based on the inclusion of the tapered ends, if one end is broken off, the optimized lengthwise movement of the board can be overshot as the broken board is ended against the positioning fence, resulting in a board that is trimmed non-optimally. Further, if the board is translated laterally by the rollers more than a small distance before the board contacts the positioning fence, the lateral velocity and acceleration of the board will often result in the board bouncing off the positioning fence. This also causes loss of accuracy in optimizing trimming of the board because the optimizer and controller regulating the lateral optimized positioning of the board relative to the saws uses positioning information based on the assumption that the board is ended closely against the positioning fence.

Thus, it is the object of the present invention to provide a board positioning device which can accurately position selected boards lengthwise, that is, transversely across the transfer deck and process the boards through the trimmer at a higher rate of speed than prior art devices and without substantial board slippage or bounce, or collapse of the board's weak ends, to thus provide an improvement in maintaining a consistently accurate and optimally trimmed board.

SUMMARY OF THE INVENTION

Lugged transfer chains translate boards onto a transfer table, and subsequently translate the boards to positioners and through a trimmer. The transfer table includes a plurality of ending rolls that direct the boards laterally against the first board positioner, where this board positioner has moved into the first contact position as the positioner circulates around on drive chains or belts. A plurality of board positioners are arranged around the outside of the chains or belts. The chains or belts rotate in the same speed and direction as the lugged transfer chain. A board positioner's paddle is timed to cooperate with the transfer chains so as to align one paddle with each board in each lugspace of the transfer chains as the board positioners circulate around the positioning apparatus on the chains or belts. A plurality of guides are mounted adjacent the top surface of the chains or belts of the positioning device. Each guide is independently selectively positionable to allow not only independent optimized board positioning of successive boards at high transfer chain speeds but also progressive board positioning along a trajectory that initially engages the board with the paddle, before ending rollers give the board a lateral velocity and acceleration sufficient to cause board breakage or bounce, and which trajectory subsequently progressively positions the board laterally into an optimized lateral positioning under the lateral urging force of the ending rolls urging the board against the paddle.

A board positioner consists of a sleeve carried on the positioner chains or belts. A shaft slides in the sleeve. The paddle is mounted on one end of the shaft, being that end of the shaft adjacent the lugged transfer chains. The shaft has a pin or roller mounted to, and protruding therefrom, to slidingly engage a channel in a guide.

The guide translates each shaft as the board positioner translates on the positioner chains or belts. The shaft is moved, that is, slid in the sleeve by the guide coming in contact with the pin or roller extending from the shaft. Each positioning guide pivots about a pivot point at an upstream end. The free end of the guide, that is the downstream end, is moved by a selectively actuable positioning cylinder or electrically driven stepping device, activated by a controller. The controller receives information from a scanner and optimizer. The rollers or pins extending from the shaft may protrude through an aperture in the sleeve.

Each board positioner, has an opposed or twinned board positioner on the positioner chains or belts or twin that has a roller or pin mounted in the same position relative to its shaft as its twin board positioner. Thus, as one board positioner exits a guide channel at the downstream end, the roller or pin on the opposing twinned board positioner enters into sliding engagement with that guide channel at its fixed upstream end. Each board positioner has a return guide that resets the board positioner to its first contact position.

In summary, in a board positioning device for longitudinally positioning a board translating in a first direction at a translation speed on a board translating device, wherein the board translating in the first direction is aligned along its length in a second direction perpendicular to the first direction and the board is urged by board ending means in the second direction against a board positioning member on the board positioning device, wherein the first and second directions lie in a generally horizontal plane, the board positioning device includes (a) a selectively actuable guide member cooperating with the board positioning member for selectively actuably guiding and positioning in the second direction the board positioning member, and (b) a board positioning member translating means for translating the board positioning member in the first direction at the translation speed in cooperative alignment with the board, wherein the board is urged against the board positioning member by the board ending means and the board positioning member selectively positioned at a board optimizing position to thereby selectively position the board in the second direction at an optimized board position predetermined by optimization means cooperating with the selectively actuable guide member.

Advantageously, the selectively actuable guide member is pivotable at a first location about a first end of the selectively actuable guide member. The board positioning member translating means is a flexible rotatable member, such as a chain or belt, rotating in a generally vertical plane generally perpendicular to the generally horizontal plane and generally perpendicular to the second direction, the board positioning member slideably mounted to the flexible rotatable member for selective sliding in the second direction.

The flexible rotatable member rotates in the vertical plane so as to translate the board, in a first direction, positioning member substantially in the horizontal plane when cooperatively aligned with the board, at the translation speed, while the board is urged in the second direction between a board positioning member engaging position, wherein the board is urged against the board positioning member and the board positioning member is in a first contact position, and the optimized board position predetermined by optimization means.

The board positioning member has a guide member engaging means for slideably coupling, by coupling means, the board positioning member to the selectively actuable guide member. The selectively actuable guide member lies generally in the horizontal plane. The coupling means guides the positioning of the board positioning member in the second direction as governed by the slideable coupling of the board positioning member to the selectively actuable guide member while the board positioning member is being translated in the first direction generally in the horizontal plane by the rotation by the flexible rotatable member in the vertical plane. The guide member engaging means is disengageable from the coupling means on the selectively actuable guide member as the board positioning member is rotated by the flexible member out of generally the horizontal plane by the rotation of the flexible rotatable member in the vertical plane.

Means are provided for returning the board positioning member from the optimized board position to the first contact position. Such means may operate as the board positioning member is rotated while not in the horizontal plane by the rotation of the flexible rotatable member in the vertical plane so that as the board positioning member is rotated to re-enter the horizontal plane, the guide member engaging means re-engages the coupling means on the selectively actuable guide member at the first location.

Further advantageously, the means for returning the board positioning member from the optimized board position to the first contact position is a fixed, angled guide means for slideable engagement with the board positioning member. Thus, in one embodiment, as the board positioning member is rotated past the board optimizing position, and out of the horizontal plane, by the flexible rotatable member rotating in the vertical plane, the board positioning member slideably engages the fixed, angled guide means and the board positioning member is slideably returned in a direction opposed to the second direction from the board optimizing position to the first contact position by the time the board positioning member is rotated into generally the horizontal plane by the rotation of the flexible rotatable member in the vertical plane.

In one aspect of the present invention, the selectively actuable guide member is a channel member and the coupling means is a channel along the channel member for slideably engaging therein the guide member engaging means, wherein the guide member engaging means is a rigid member such as a pin or roller rigidly mounted to, and protruding from, the board positioning member.

In a further aspect, the optimized board position is predetermined by a board optimizer, such as an optical scanner and its cooperatively associated optimization information processor and controller, scanning and providing optimization and control information to the board positioning device in relation to an optimized trimming solution for the board.

DETAILED DESCRIPTION OF THE PREFERRED EMBODIMENT

Figure 1:
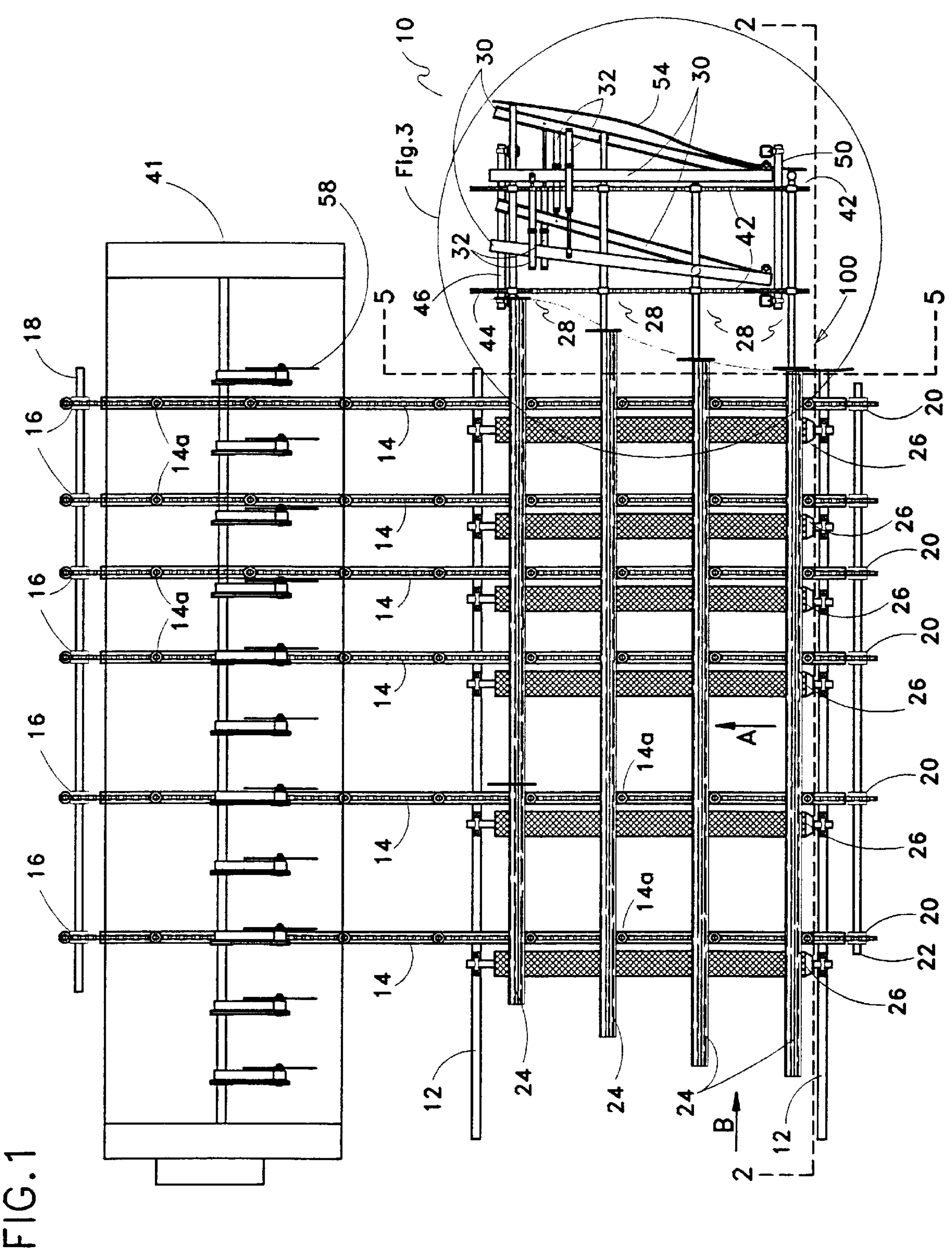
FIG. 1 is a plan view of the board positioning device according to a preferred embodiment of the invention.
Figure 2:
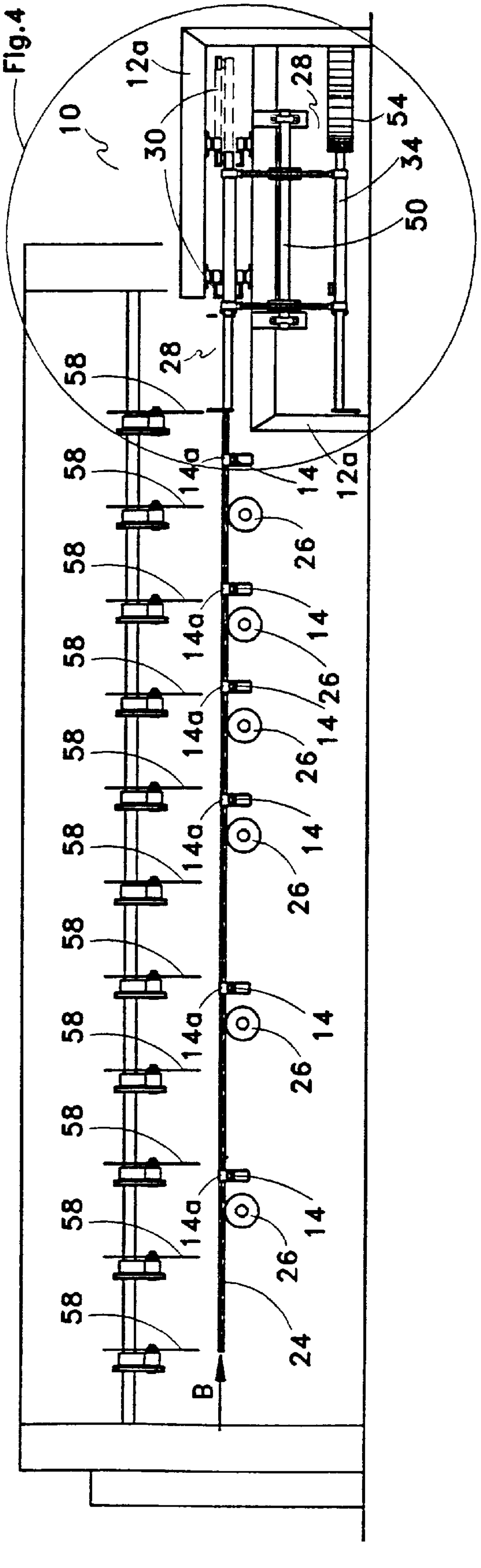
FIG. 2 is a side cross-sectional view along section line 2—2 in FIG. 1.

Referring to the drawing figures wherein similar characters of reference represent corresponding parts in each view, the apparatus is generally indicated by the reference numeral 10 and is best seen in FIG. 1 and FIG. 2. The apparatus 10 includes a square tubular support frame constructed of vertical and horizontal structural supports 12. A laterally spaced apart array of parallel, longitudinally extending lugged transfer chains 14 are driven by transfer chain drive sprockets 16 on a transfer chain drive shaft 18. A pair of transfer chain idler sprockets 20 are rotatably mounted on transfer chain idler shaft 22. Lugged transfer chains 14 transfer boards 24 over ending rolls 26. Ending rolls 26 urge boards 24 against the board positioning device of the present invention.

Boards 24 are urged against board positioners 28 and in particular, against positioner paddles 40. Channel-like positioner guides 30 are each selectively positionable by means of corresponding bi-directional logically, selectively actuable positioning cylinders 32. Positioner guides 30 pivot on pivot pins 52.

Board positioners 28 include positioner sleeves 34 in which are slidingly journalled positioner shafts 38. Positioner guide rollers (or pins) 36 are mounted to and protrude from positioner shafts 38 so as to slidingly engage guides 30. Positioning paddles 40 are mounted on the ends of shafts 38 to provide a surface against which boards 24 abut.

The board positioners 28 are mounted on a set of positioner chains (or belts) 42 that are, at one end, mounted on, and driven by, positioner drive sprockets 44 on positioner drive shaft 46, and at their other end, mounted on a pair of positioner idler sprockets 48 on a positioner idler shaft 50. Shafts 46 and 50 are rotatably mounted on frame members 12*a* shown in FIG. 2, but only shown in partial fragmentary view in FIG. 3 for sake of clarity.

Curved positioner return guide 54 is mounted to the bottom of frame 12*a* and disposed inwardly so as to engage the ends of shafts 38 opposite paddles 40.

Lugged transfer chains 14 are used to carry the boards 24 through the board positioning process and into the trimmer

41 where the trimmer saws 58 are actuated to trim the boards 24. Thus, in operation, boards 24 are moved in direction A, onto ending rolls 26 by the lugged transfer chains 14. Rollers 14*a* are attached as the contact surface of the lugs. The ending rolls 26 are rotating with the top moving towards the board positioners 28, so as to urge boards 24 in direction B. The board positioners 28 circulate around on positioner chains 42 so as to position paddles 40 as board 24 moves in to a first contact position 100.

An electro-optical scanner (not shown) scans boards 24 and provides shape and flow information to an optimizer such as a programmed computer. The optimizer shown diagrammatically in FIG. 3, sends signals to a computer logic controller for the corresponding board 24. The logic controller activates and selectively actuates bi-directional positioning cylinders 32 as board 24 is translated on transfer chain 14. As board positioners 28 rotate on positioner chains 42, board positioner paddles 40 on shafts 38 progressively slide laterally in sleeves 34 to optimized positions for their corresponding boards 24 as determined by the optimizer. Sliding positioning of shafts 38 is the result of the progressive actuation of bi-directional selectively actuable positioning cylinders 32 which move positioner guides 30 and move positioner shafts 38 by means of guide rollers 36. Ending rolls 26 continue to translate boards 24 laterally in direction B until the boards 24 reach the end of positioner chains 42. By the end of positioner chains 42, board positioner paddles 40 have progressively moved to their optimized lateral position for the corresponding board 24. The board positioners 28 are returned to their non-optimized positions at the upstream end of positioner chains 42 by positioner return guide 54.

Figure 3:
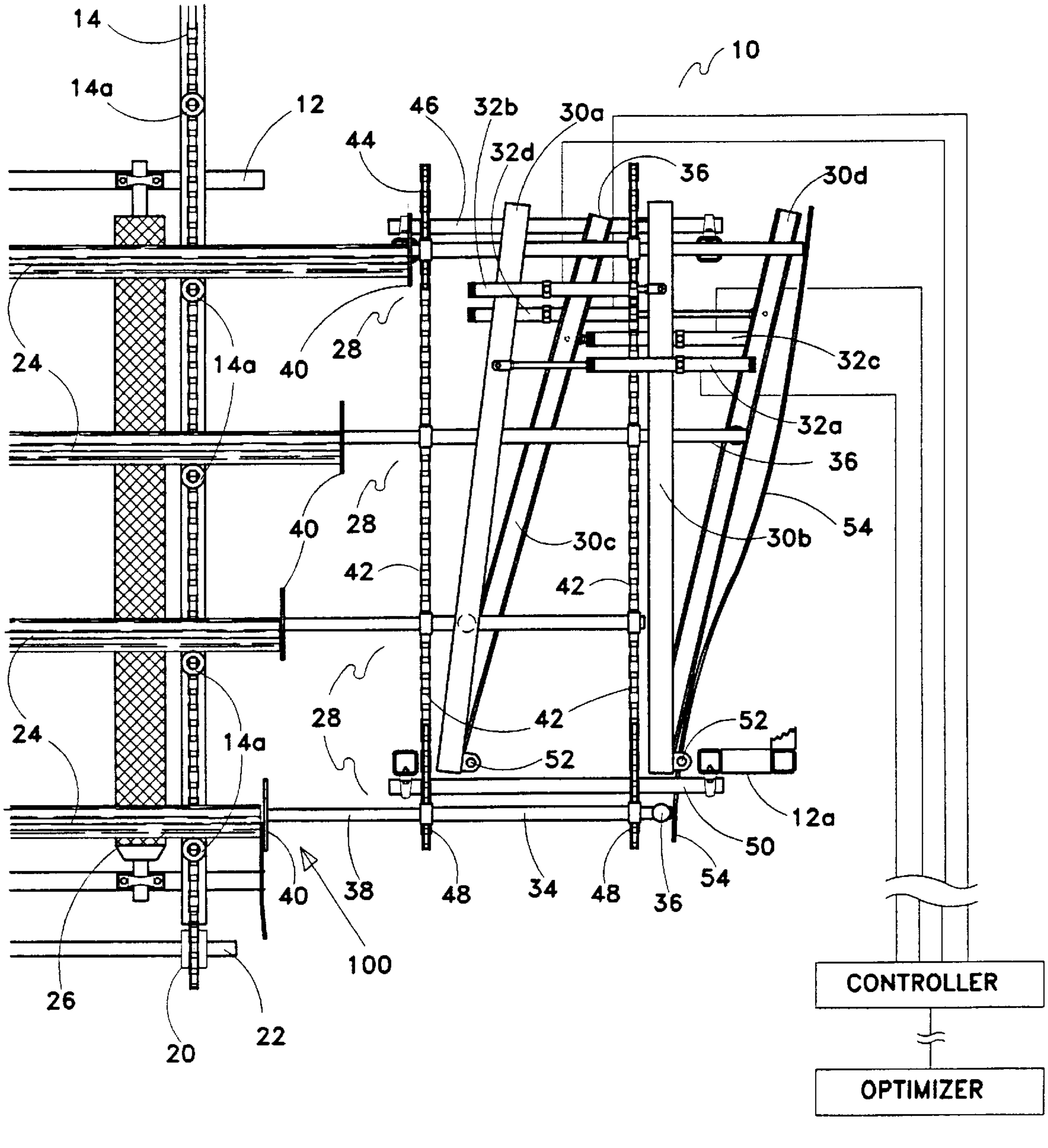
FIG. 3 is an enlarged, fragmentary view of the board positioning device of FIG. 1.

The ends of shafts 38 opposed to paddles 40 slidingly contact guide 54, the surface of guide 54 acting as a cam surface to drive shafts 38 through sleeves 34 as sleeves 34 are rotated along the lower longitudinal surface 42*a* of the oval formed by chains 42. As shafts 38 in sleeves 34 are rotated to the upper longitudinal surface 42*b* of chains 42, guide 54 has positioned shaft 38 so that the position of roller 36 corresponds to the roller receiving position of positioner guide 30. At any one time, four positioner shafts 38 are spaced apart on the upper surface 42*b* of rotating positioner chains 42, and, as shown in FIG. 3, four corresponding positioner shafts 38 are spaced apart on the lower surface 42*a* of rotating positioner chains 42, for a total of eight equally spaced apart shafts 38 on chains 42. As a shaft 38 is rotated from the lower surface 42*a* to the upper surface 42*b* of chains 42, the corresponding roller 36 is aligned to slidably engage the channel entrance to one of the four guides 30, the particular guide being the guide corresponding to the one of the four guides 30 from which a shaft 38 has just rotated from the upper surface 42*b* to the lower surface 42*a* of chains 42 thereby removing its roller 36 from the channel of that guide 30.

Figure 4:
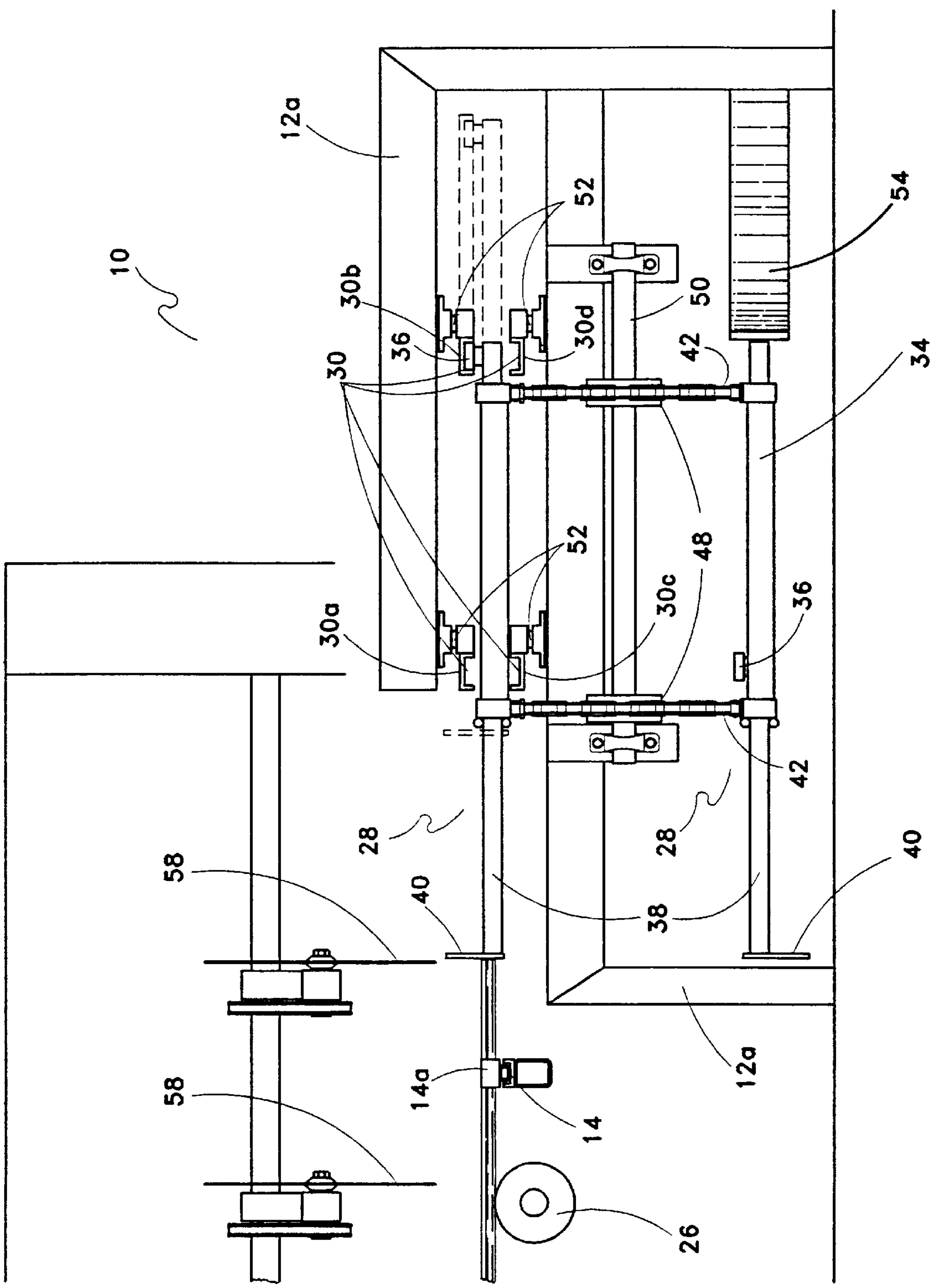
FIG. 4 is an enlarged, fragmentary view of the board positioning device of FIG. 2.

As may be best seen in FIG. 4, the four guides 30 are labelled for certainty 30*a,* 30*b,* 30*c* and 30*d*. Thus, for a particular roller 36 on a shaft 38 rotating to the upper surface 42*b* of chains 42 (so as to move in direction A in cooperating parallel alignment with a corresponding board 24), depending on which of guides 30*a,* 30*b,* 30*c* or 30*d* is next in sequence to receive the roller 36 being rotated into alignment, roller 36 has to be, as viewed in FIG. 4, top left, top right, bottom left or bottom right relative to shaft 38. A roller 36 is shown in FIG. 4 slidably engaged in the top right guide 30*b*. As also illustrated in FIG. 4, the next shaft 38 to rotate to the upper surface 42*b* of chains 42 will have a roller 36 in a bottom left alignment relative to shaft 38 once shaft

Figure 5:
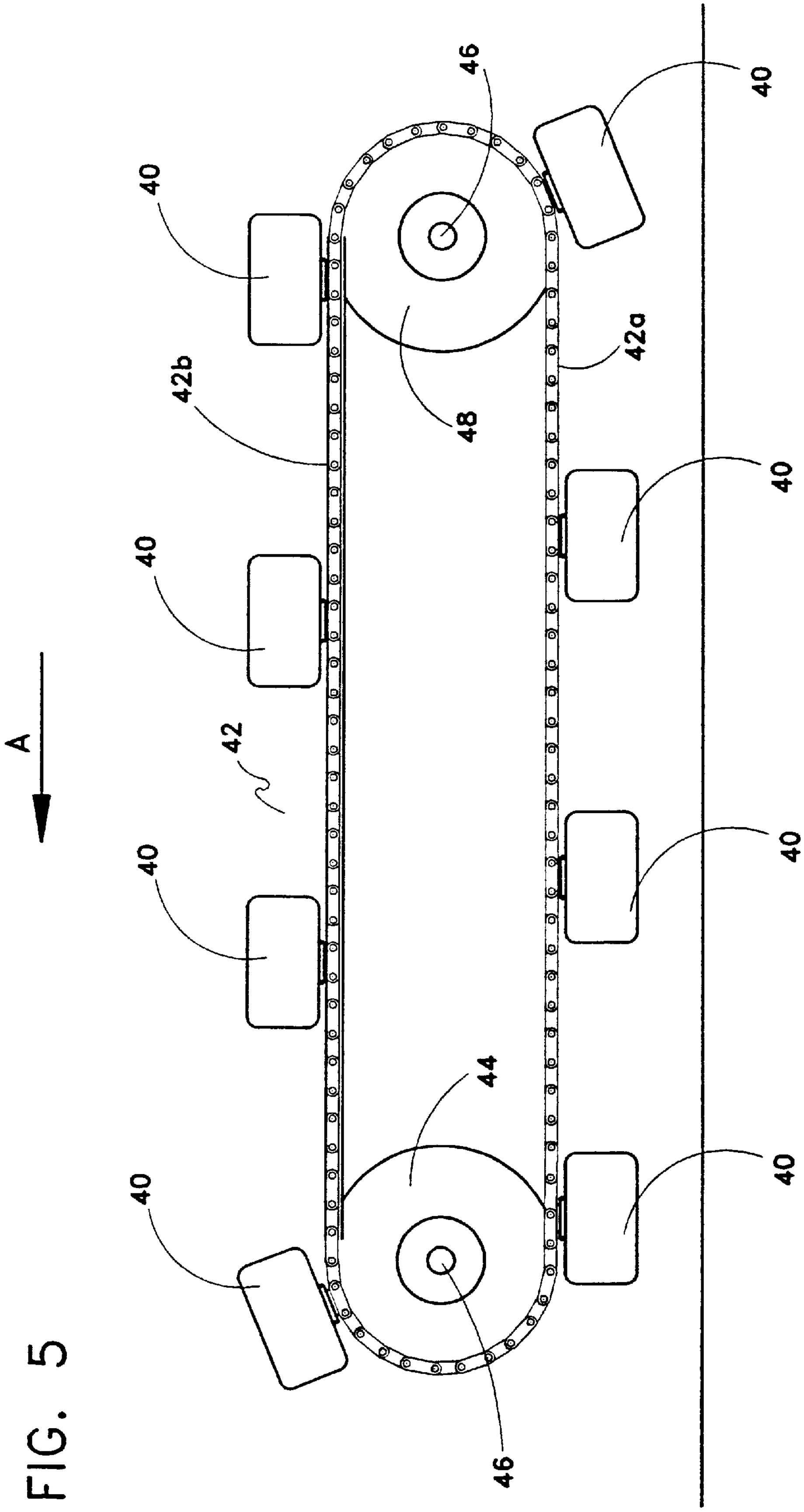
FIG. 5 is a partial end elevation view along section line 5—5 in FIG. 1.

38 has been rotated so as to bring that roller 36 into alignment with guide 30*c*. Continuing in sequence the following shaft 38 would rotate its roller 36 into alignment with guide 30*d,* and the next following shaft 38 would then rotate its roller 36 into alignment with guide 30*a,* and so on sequentially. Consequently it may be seen that, for the sake of clarity, FIG. 4 is an incomplete view. In a complete view of FIG. 4, only guide 30*b* would be viewed exactly end-on because of its perpendicular instantaneous alignment to shaft 38, the other guides 30*a,* 30*c,* 30*d* in fact being viewed obliquely because of their oblique orientations as seen in FIGS. 1 and 3. The representation in FIG. 5 is also incomplete for sake of clarity, and also is not, as shown, an instantaneous view along line 5—5 in FIG. 1, but rather a view along line 5—5 once the rotation of chains 42 has proceeded through a further approximately 45 degrees of rotation of sprockets 44 and 48.

Although not illustrated, it is clear that, in order for rollers 36 to engage guides 30*a* and 30*c,* and still cooperate with corresponding shafts 38 so as to extend or retract those shafts 38 slidingly journalled in sleeves 34, rollers 36 must extend through the walls of sleeves 34 as for example by a pin journalled in a slot in corresponding sleeve 34.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A board positioning device for longitudinally positioning a board translating in a first direction at a translation speed on a board translating device, wherein said board translating in said first direction is aligned along its length in a second direction perpendicular to said first direction and said board is urged by board ending means in said second direction against a board positioning member on said board positioning device, wherein said first and second directions lie in a generally horizontal plane, said board positioning device comprising:

(a) a selectively actuable guide member cooperating with said board positioning member for selectively actuably guiding and positioning in said second direction said board positioning member, (b) a board positioning member translating means for translating said board positioning member in said first direction at said translation speed in cooperative alignment with said board, wherein said board is urged against said board positioning member by said board ending means and said board positioning member selectively positioned at a board optimizing position to thereby selectively position said board in said second direction at an optimized board position predetermined by optimization means cooperating with said selectively actuable guide member.

2. The board positioning device of claim 1 wherein said selectively actuable guide member is pivotable at a first location about a first end of said selectively actuable guide member, and wherein said board positioning member translating means is a flexible rotatable member rotating in a generally vertical plane generally perpendicular to said generally horizontal plane and generally perpendicular to said second direction, said board positioning member perpendicularly slideably mounted to said flexible rotatable member for selective sliding in said second direction, said flexible rotatable member rotating in said vertical plane so as to translate, in said first direction, said board positioning member substantially in said horizontal plane when cooperatively aligned with said board, at said translation speed, while said board is urged in said second direction between a board positioning member engaging position, wherein said board is urged against said board positioning member when said board positioning member is in a first contact position, and said optimized board position, said board positioning member having a guide member engaging means for slideably coupling, by coupling means, said board positioning member to said selectively actuable guide member, wherein said selectively actuable guide member lies generally in said horizontal plane, said coupling means guiding positioning of said board positioning member in said second direction as governed by slideable coupling by said coupling means of said guide member engaging means on said board positioning member to said selectively actuable guide member while said board positioning member is being translated in said first direction generally in said horizontal plane by said rotation by said flexible rotatable member in said vertical plane, said guide member engaging means disengageable from said coupling means on said selectively actuable guide member as said board positioning member is rotated by said flexible rotatable member out of generally said horizontal plane by said rotation of said flexible rotatable member in said vertical plane, and means for returning said board positioning member from said board optimizing position to said first contact position as said board positioning member is rotated by said flexible rotatable member in said vertical plane, whereby said guide member engaging means is repositioned to re-engage said coupling means on said selectively actuable guide member at said first location.

3. The board positioning device of claim 2 wherein said means for returning said board positioning member from said optimized board position to said first contact position is a fixed, angled guide means for slideable engagement with said board positioning member, wherein as said board positioning member is rotated in said first direction so as to translate past where said board positioning member is in said board optimizing position by said flexible rotatable member rotating in said vertical plane, said board positioning member slideably engages said fixed, angled guide means and said board positioning member is slideably returned in said second direction from said board optimizing position to said first contact position by the time said board positioning member is rotated into generally said horizontal plane by said rotation of said flexible rotatable member in said vertical plane.

4. The board positioning device of claim 3 wherein said selectively actuable guide member is a channel member and said coupling means in a channel along said channel member for slideably engaging therein said guide member engaging means, wherein said guide member engaging means is a rigid member rigidly mounted to, and protruding, from said board positioning member.

* * * * *